United States Patent [19]
Miller

[11] Patent Number: 6,029,798
[45] Date of Patent: Feb. 29, 2000

[54] METHODS AND SYSTEM FOR DETECTING AND DETERMINING THE LOCATION OF A CHAIN JAM

[75] Inventor: Michael Miller, Stoney Creek, Canada

[73] Assignee: Jervis B. Webb Company, Farmington Hills, Mich.

[21] Appl. No.: 09/035,060

[22] Filed: Mar. 5, 1998

[51] Int. Cl.[7] .................................................. B65G 43/00
[52] U.S. Cl. ........................ 198/810.01; 198/810.04; 198/502.1
[58] Field of Search ..................... 198/810.01, 810.02, 198/810.04, 502.1

[56] References Cited

U.S. PATENT DOCUMENTS

| | | | |
|---|---|---|---|
| 2,932,382 | 4/1960 | James | 198/810.01 |
| 3,368,781 | 2/1968 | Comely | 198/810.04 |
| 4,564,099 | 1/1986 | Uozumi | 198/810.04 |
| 4,579,218 | 4/1986 | Park et al. | |
| 4,657,131 | 4/1987 | Brychta et al. | 198/810.04 |
| 5,143,206 | 9/1992 | Hoover | |
| 5,251,492 | 10/1993 | Nowag | |
| 5,517,863 | 5/1996 | Sodermalm | |

*Primary Examiner*—William E. Terrell
*Assistant Examiner*—Mark Deuble
*Attorney, Agent, or Firm*—Dickinson Wright PLLC

[57] ABSTRACT

A method and system for detecting a condition indicative of a chain jam in a power driven endless chain are disclosed. The chain of such a system is forced into a zigzag pattern by the inclusion of deflectors at various positions along the chain pathway and the force exerted against these deflectors is measured by sensors. When a jam occurs the force on the deflectors between the location of the jam and the drive, in the direction upstream from the drive, increases, and this increase is sensed and used to actuate indicators near each of the sensors at which such an increase has occurred. The chain jam is found upstream of the furthest actuated indicator from the drive.

10 Claims, 3 Drawing Sheets

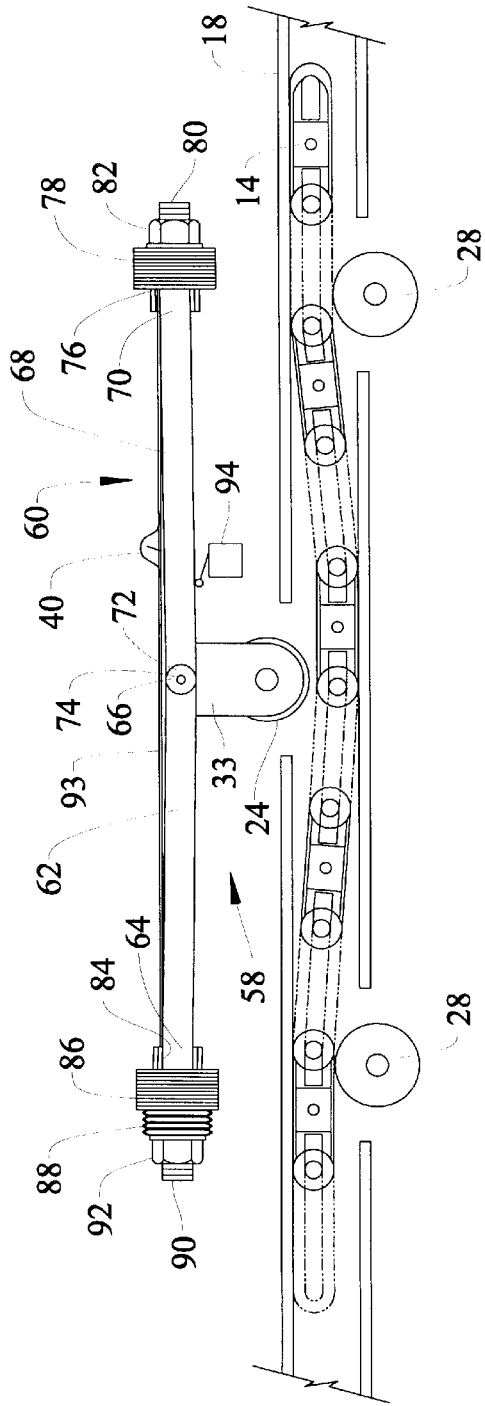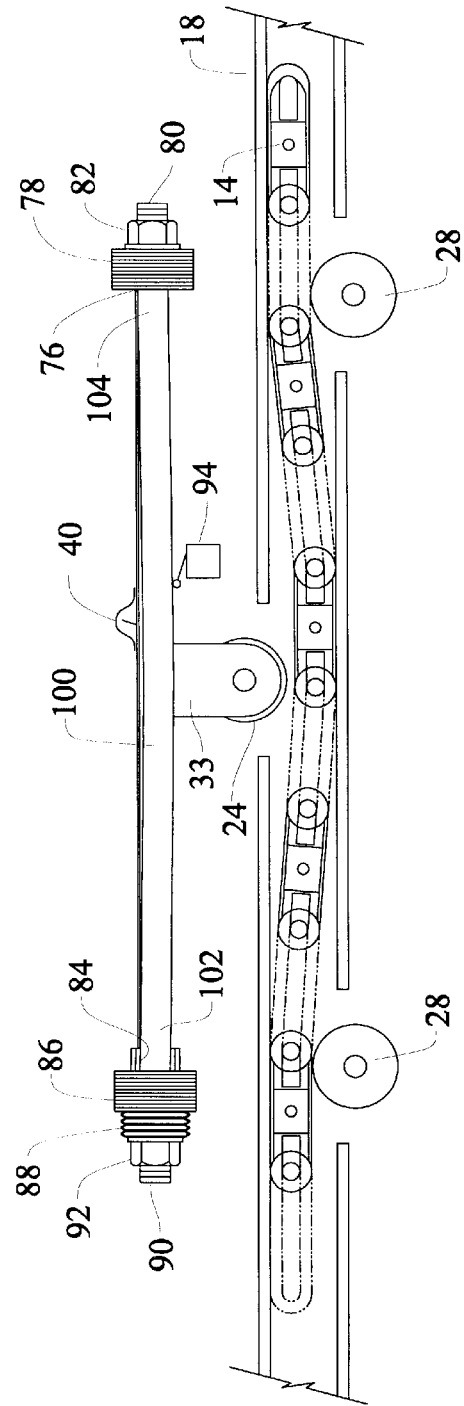

METHODS AND SYSTEM FOR DETECTING AND DETERMINING THE LOCATION OF A CHAIN JAM

The present application is directed to a method and system for detecting and determining the location of a chain jam, and more specifically, toward a method and system of sensing for a condition indicative of a chain jam at a plurality of locations along a chain and providing an indication of where along the chain that condition exists.

BACKGROUND OF THE INVENTION

Conveyor systems are the backbone of any production line, moving raw materials to assembly stations, partially finished goods through various processing stations, and finished goods to storage. If a conveyor system breaks down, all operations associated with that system must cease while the problem is located and corrected. And, because the outputs from one conveyor line may be used as the inputs for another line, problems with one conveyor may have an impact upon operations throughout a plant. Each minute that a system is down, labor and equipment remain idle, and this increases production costs and decreases the efficiency of an operation. Clearly, it is important to keep conveyors running continuously and to correct any problems that do occur as quickly as possible.

Many conveyor systems include a power chain that is connected to a drive mechanism. The ends of the chain are connected to each other to form an endless loop, and the chain is passed around a drive sprocket and driven about a pathway. As used herein, the term "chain" is intended to include both traditional chains of interconnected metal or plastic links, and belts, cables as well as other arrangements capable of being used like a chain. A conveyor belt or independent carriers may be connected directly to the chain, or more often, the power chain will be used to push trolleys or other carriers along a "free" track closely spaced from the power chain. In such a power and free system, pusher elements are connected directly to the driving chain and extend a short distance away from the power chain to contact pusher dogs on the carriers. The carriers are pushed along the free track by the pushers, and when it is desired to stop a carrier, the pusher dog on the carrier is retracted and the carrier stops. In this manner, the motion of each carrier can be controlled independently. Carriers, such as trolleys, may also be configured so that the impact between a moving trolley and a trolley that has been stopped downstream of the moving trolley will disengage the moving trolley from the pusher and power chain.

Conveyor systems are prone to jamming, and jam conditions can be difficult to locate, especially when the power chain is substantially enclosed in a housing. Jams can occur in many ways. A jam might be caused by a foreign object that becomes lodged between the housing and the power chain, or by a kink in the chain, possible caused by insufficient lubrication, which kink becomes jammed in a turn or in a portion of the housing. Jams can also occur when a pusher contacts a part of the power chain housing or a fixed object that has been placed too close to the power chain. Finally, a jam can occur when a trolley does not properly disengage from the power chain, such as when it is being accumulated with other carriers at a stopping location on the track. When a jam occurs the conveyor system stops, but there is generally no way of knowing what kind of jam is present.

A conveyor system may be hundreds or even thousands of feet long. When the system jams it comes to a stop, and it can be very difficult to determine even generally where the jam is located. The carriers and their spacings can be examined first, and this requires a visual examination of the entire length of the track. If the problem is not caused by a carrier jam, then the entire length of the chain must be inspected. This examination is made more difficult when, as is often the case, the chain is partly or substantially enclosed by a housing which prevents the chain from being easily seen. Many jams can be quickly corrected once they are located, but locating a jam is a time consuming process. It would therefore be desirable to provide a jam detection system and method for identifying the location of a jam when it occurs to minimize the examination process which has heretofore been necessary to find the jam location.

SUMMARY OF THE INVENTION

The present invention is directed toward such a jam detection system and method of using same which system comprises a number of sensors spaced around a conveyor track for sensing a condition of the conveyor system indicative of a jam condition upstream or downstream from that sensor. A number of indicators are also provided corresponding to each of the sensors, which indicators are preferably visual indicators located in physical proximity to their corresponding sensors. Each sensor which senses a jam condition in a given direction from the drive actuates a corresponding indicator, while sensors in the opposite direction from the jam location will not detect the jam and will not be actuated. The jam will be found between the last actuated indicator and the first non-actuated in a given direction from the conveyor drive. The location of the jam can be determined with increasing precision by decreasing the spacing between the sensors. Furthermore, the subject system can be incorporated into new conveyor systems or retrofitted into existing systems.

In a preferred embodiment, the condition sensed by the sensors is chain tension. When a jam occurs, the portion of the chain at the jam location will become fixed with respect to the drive. Consequently, the tension in the chain between the jam and the drive will increase substantially as the drive attempts to pull against this fixed chain portion. This increased tension will be sensed by all of the sensors between the jam location and the drive and actuate indicators at each location where the chain tension has exceeded a predetermined level. The preferred indicators are small lights attached near the location of the sensor which light up when actuated. An engineer or mechanic can then find the approximate location of the jam by following the conveyor system away from the drive until he comes to an indicator that is not lit. The jam will be found downstream from that indicator and upstream from the last illuminated indicator. If a vantage point exists from which the entire conveyor system can be viewed, the location of the jam can be ascertained almost simultaneously with its occurrence. Such a system allows the approximate location of the jam to be determined almost instantly, and reduces the amount of time necessary for pinpointing the location of the jam to a fraction of that which would have been required were such a system not in place.

Chain tension is sensed in the preferred embodiments by deflecting a portion of the chain from the linear pathway that it normally follows and measuring the force with which the chain resists this deflection. When chain tension increases, such as when a jam occurs upstream from the sensor, the chain will be pulled taut between the jam and the drive unit and press strongly against the deflectors as it is pulled toward a linear configuration. A series of deflectors are provided which are preferably rollers over which the chain can travel. Two auxiliary rollers are used to bias the chain away from its normal path of travel in a first direction, and a third primary deflector is placed between the auxiliary deflectors to push against the chain in a second direction opposite to the first direction. Each primary roller is associated with two auxiliary deflectors, but these auxiliary deflectors may be shared by neighboring primary deflectors. When the auxiliary deflectors are shared, the chain follows a zigzag path around the entire pathway. When the auxiliary deflectors are not shared, the chain zigzags only in the immediate area of the deflectors and is generally linear about the rest of the path. In this manner, a maximum degree of deflection can be obtained within a fairly limited area, the inside of a protective chain housing, for example. When chain tension increases, the primary rollers do not move, but the tension pulls the chain segment between the auxiliary rollers taut and pushes strongly against the primary deflector. The tension in chain segments upstream from the jam will be normal or below normal when a jam occurs and their respective indicators will not be activated.

The sensors may be of any type suitable for detecting a change of force exerted against the primary deflector caused by increased chain tension. For example, the primary deflector could be movable and spring biased against the chain, and a common limit switch arrangement could be used to sense movement of the deflector caused by increased chain tension. However, because the amount of deflection will be relatively small and because chain tension can vary during normal conveyor operation, such arrangements can be difficult to calibrate and will often give false readings. Therefore, in the preferred embodiment, a load cell is used for directly measuring the force exerted by the chain on a fixed primary deflector. When the sensed force exceeds a certain level, a jam condition is assumed to exist. In the preferred embodiment, the primary deflector is fixed; however in some instances, it may be desirable to mount the load cell on a spring to minimize damage to the load cell under particularly high forces.

In a second preferred embodiment, a Belleville washer assembly is attached between a fixed object and one end of a hinged joint while the other end of the joint is affixed to a stationary object. The hinge of the joint is then coupled to the primary deflector. The hinged joint is normally bent slightly toward the chain deflector so that pressure exerted by the chain on the deflector tends to push the joint toward its fully open configuration and outwardly against the washer arrangement. The Belleville washer assembly is designed to collapse when the force placed on it exceeds a predetermined level. Therefore when the a jam occurs, the force on the joint increases and places enough stress on the washer assembly to cause it to collapse. Movement of the joint is used to trigger a limit switch or otherwise indicate that the collapse has occurred and that a jam is present. Alternately, the hinged joint may be replaced with a flat spring that is bowed slightly toward the movable roller. The spring will be forced back to a linear shape when a chain jam increases the force exerted upon the spring by a chain jam.

In a variation on either of the above embodiments, indicators are located at a distance from the sensors instead of or in addition to being located near the sensors themselves. For example, the sensors could be connected to a central controller which displays a representation of the conveyer system on a computer terminal. The display shows the location of each sensor and identifies which of the sensors is illuminated. A mechanic could then be dispatched quickly to the approximate site of the jam instead of following the path of the conveyor upstream of the drive. Indicators could also be present on the track itself in this embodiment to make the location of the jam site easier to find.

It therefore the primary object of the present invention to provide a method and system for sensing a condition of an endless driven chain at a plurality of locations around the pathway followed by the chain.

It is another object of the present invention to provide a method and system for measuring properties of an endless driven chain which differ on opposite sides of the location of the jam.

It is a further object of the present invention to provide a method and system for determining the location of a chain jam.

It is still another object of the present invention to provide a method and system of sensing chain tension at a number of locations along a driven power chain.

It is still a further object of the present invention to provide a method and system for equipping a conveyor system with a plurality of visual indicators for showing approximately where along the path of the conveyor system a chain jam has occurred.

It is yet another object of the present invention to provide a chain jam indicator that can be retro-fitted to an existing system.

It is yet a further object of the present invention to provide a method and system for detecting chain jams which provides information about chain status during normal operation of the system.

It is another object of the present invention to provide a method and system of using load cells and a chain deflector to determine the location of a chain jam.

It is a further object of the present invention to provide a method and system for detecting chain jams which can be installed in a variety of configurations to detect the location of a chain jam with varying degrees of precision.

BRIEF DESCRIPTION OF THE DRAWINGS

These and other objects of the present invention will become apparent after a reading and understanding of the following detailed description of several preferred embodiments of the invention together with the following drawings of which:

FIG. 6 is a sectional side elevational view of a second embodiment of a sensor for measuring tension in a power chain;

FIG. 7 is a sectional side elevational view of a third embodiment of a sensor for measuring tension in a power chain; and, FIG. 8 is a front elevational view of a computer display showing an alternate set of indicators for showing the location of a jam sensed by the sensors.

DETAILED DESCRIPTION OF THE PREFERRED EMBODIMENTS

Figure 1:
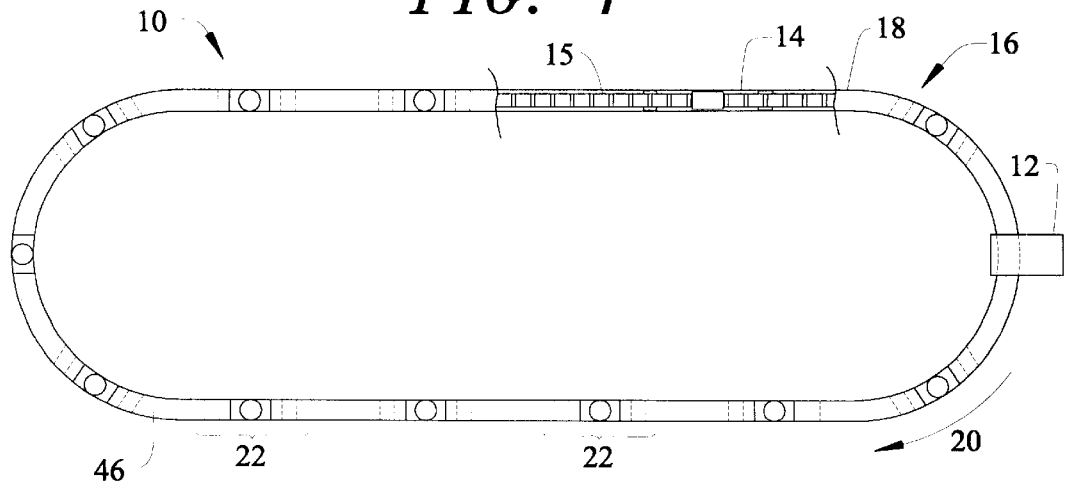
FIG. 1 is a top plan view, partly in section, of a conveyor system equipped with a chain jam detector according to the present invention.

Referring now to the drawings, wherein the showings are for purposes of illustrating several preferred embodiments of the subject invention only, and not for the purpose of limiting same, FIG. 1 shows an overview of a conveyor system 10 including a drive 12 for propelling a chain 14 along a closed pathway 16 defined by a chain housing 18 having a centerline 19. The chain moves in the direction of arrow 20, which direction is clockwise as viewed in FIG. 1. The chain includes two opposite surface which will be referred to hereinafter as upper surface 15 and lower surface 17, it being understood that the chain may travel in an orientation where these surfaces become side surfaces or wherein the lower surface is at a higher elevation than the upper surface. The system 10 is equipped with a plurality of tension sensors 22 spaced around pathway 16, the operation of which will be described in further detail hereinafter.

In the preferred embodiment, chain 14 is the power chain in a power and free conveyor system, a common type of conveyor system in which pusher members extend from a power chain and are used to move a plurality of carriers around a secondary track or free track. However, the present invention could be practiced in connection with any system that includes a chain, belt, or cable driven about a pathway and which is prone to occasional jamming. For ease of reference, all such belts, cables, etc., will be referred to herein as "chains." The particular system with which the power chain is used can vary widely and does not form a part of the present invention.

Figure 2:
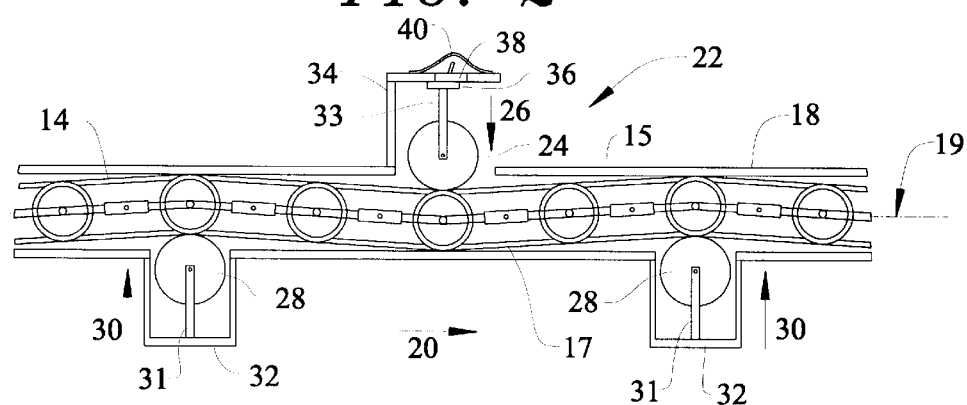
FIG. 2 is a sectional side elevational view of the power chain of the conveyor shown in FIG. 1 and a first embodiment of a sensor for measuring tension in the power chain.

FIG. 2 is a detailed view of one of the sensors 22 and of chain 14. Each sensor 22 comprises three rollers for deflecting chain 14 from the normally linear path that it follows along centerline 19 of housing 18: a primary deflecting roller 24 for deflecting the chain in a first direction 26 and a pair of secondary rollers 28 located on the upstream and downstream sides of roller 24 for deflecting chain 14 in a second direction 30 opposite to first direction 26. The deflection need not be large. In a system where there exists a three eighth inch clearance between bottom chain edge 17 and the housing 18 when chain 14 follows the centerline, for example, roller 28 may deflect chain 14 in direction 30 by approximately three-eighths of an inch. Roller 24 then deflects chain 14 three-quarters of an inch in direction 26 so that the bottom edge 17 of chain 14 approaches the wall of housing 18. The horizontal spacing of rollers 24 and 28 is about 18 inches. Because the invention can be practiced using such a small deflection, the sensors can be mounted in existing housings and there is no need to modify the system extensively. Rollers 28 are rotatably supported beneath track housing 18 by holders 31 connected to brackets 32, and roller 24 is rotatably supported above the track housing by a holder 33 connected to a bracket 34. The holders are connected to the brackets and the brackets to the track in any conventional manner, preferably by welding.

Figure 4:
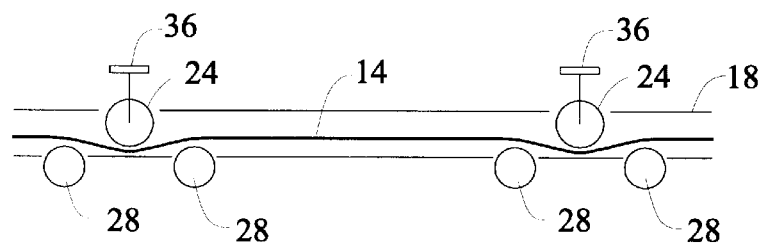
FIG. 4 is a sectional side elevational view showing, somewhat schematically, the system of FIG. 1 wherein each primary deflector is uniquely associated with a pair of auxiliary deflectors.
Figure 5:
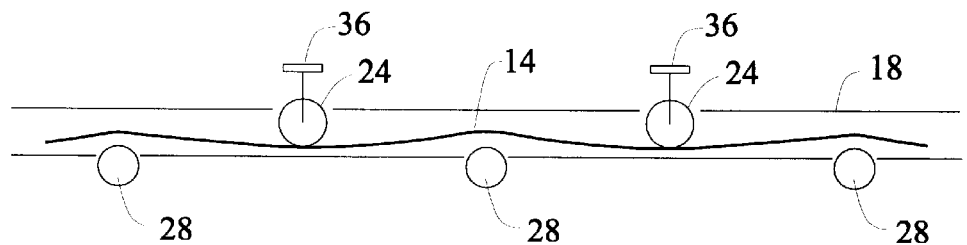
FIG. 5 is a sectional side elevational view showing, somewhat schematically, the system of FIG. 1 wherein each auxiliary deflector is shared by two primary deflectors.

Routing chain 14 between rollers 28 and 24 introduces a zigzag into the path followed by the chain. FIGS. 4 and 5 show two different routing arrangements that can be used. In FIG. 4, each pair of auxiliary rollers 28 is associated with one primary roller 24. This arrangement is used when the spacing between the primary rollers is relatively large. The relatively small space between the auxiliary rollers, as compared to the distance between adjacent auxiliary rollers, and the primary roller ensures that the chain will be deflected by a sufficient angle to make it easy to measure the sideways force placed on the primary sensor by the chain. In FIG. 5, each auxiliary roller 28 is shared between two primary rollers 24 and chain 14 zigzags between the primary and auxiliary rollers. This arrangement is suitable for use in situations where the primary rollers are relatively closely spaced and in which an adequate deflection can be obtained over the distance between the primary rollers.

Chain 14 is under significant tension as it travels around pathway 16; tensions on the order of 3300 pounds in the direction of centerline 19 are common. This tension tends to force the deflected chain 14 toward centerline 19 which places a force on the deflecting rollers. When a jam occurs, the tension on the chain between drive and the site of the jam upstream from the drive will increase significantly, and this in turn will increase the amount of force exerted on the deflecting rollers between the jam and the drive. The chain tension upstream from the jam will remain the same or decrease. Therefore, a jam condition can be quickly located by measuring chain tension at a number of locations around the chain pathway and finding the sensor furthest upstream from the drive at which an increased tension has been sensed. The jam will be found upstream from that sensor before the next sensor is reached.

Chain tension is sensed by a load cell 36 connected between primary roller holder 33 and bracket 34 which produces an output corresponding to the amount of tension sensed. This output is input into a controller 38 which controller is connected to an indicator such as lamp 40 located proximate to the sensor. When the force on load cell 36 exceeds a predetermined value, controller 38 causes lamp 40 to be illuminated. As described above, chain tension will increase at each of the sensors 22 between the drive and the jam upstream of the drive, and therefore, all of the lamps between the drive and the site of the jam will be illuminated when a jam occurs. The approximate location of the jam can thus be determined merely by looking at the indicators on housing 18. The greater the number of indicators used, the more precisely the location of the jam can be determined.

Figure 3:
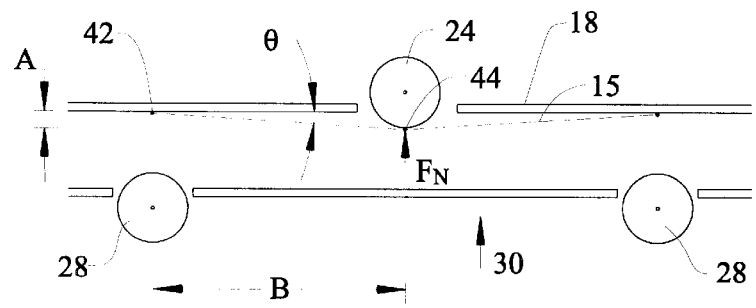
FIG. 3 is a diagram showing the force exerted on the jam detector sensor shown in FIG. 2 by the power chain.

The force on primary roller 24 is denoted $F_N$ and is depicted in FIG. 3. Force FN is exerted in a direction perpendicular to the centerline of housing 18 and tends to press against roller 24 in second direction 30. The magnitude of $F_N$ is equal to the cosine of the angle $\Theta$ formed between the inner surface of housing 18 and the line connecting point 42, located directly above roller 28 on upper side 15 of chain 14, and point 44, the point on upper side 15 at which roller 24 contacts chain 14. Angle $\Theta$ is equal to arctan A/B where A is the distance separating upper chain surface 15 from the inner wall of the housing at point 44, and B is the distance along the housing centerline between the centers of rollers 24 and 28. In a typical situation, the value for A might be 0.375 inches and the value for B might be 18 inches. This makes the ratio A/B equal to 0.0208 and arctan 0.0208 is equal to 0.0208 radians, since the tangent of an angle is approximately equal to the angle itself for small angles. The cosine of 0.0208 is also equal to approximately 0.0208. Therefore the chain tension 3300 lbs., times 0.0208 gives a result of 69 lbs for the value of $F_N$ under normal conditions. The chain tension when a jam occurs may increase to approximately 5000 lbs. At this increased tension, the force exerted by the chain on roller 24 and load sensor 32 will increase to 104 lbs. This increase in force can readily be detected by load cell 36. Assuming that normal chain tension will not exceed 4000 lbs, which would produce a $F_N$ of about 84 pounds, controller 38 can be programmed to illuminate lamp 40 whenever $F_N$ exceeds 84 lbs. The controller can also be programmed to ignore momentary tension fluctuations, such as those occurring when the chain is initially started, and only light lamp 40 when $F_N$ exceeds the desired level for more than 1 second, for example.

In operation, drive 12 is engaged to start chain 14 circulating about pathway 16 in housing 18 in the direction of arrow 20. The chain tension will increase to approximately 3300 pounds as the chain comes up to speed, and any transient increases in tension will be ignored by controllers 38. Under normal circumstances, the chain will continue to move about pathway 16 without incident, and indicators 40 will remain unlit. However, if a jam occurs, at location 46 in FIG. 1, for example, the movement of the chain will cease and the chain tension between the jam and the drive will rapidly increase. This in turn will increase $F_N$ sensed by each of the sensors 22 located between the jam and the drive 12 in the upstream direction from drive 12. The illuminated sensors 40, are shown as open circles FIG. 1 while the remaining sensors 40 are crosshatched. A mechanic need merely to start at drive 12 and walk along conveyor 10 upstream from drive 12 until he comes to an unlit lamp 12. The jam will be located between that unlit lamp and the last illuminated lamp in the series of lamps. Whereas in the past the mechanic would have had to inspect the entire pathway 16 to locate the jam, the approximate location of the jam is now quickly ascertainable, and the jam can be located and repaired in a fraction of the time that would have been required without the system of the present invention.

Figure 8:
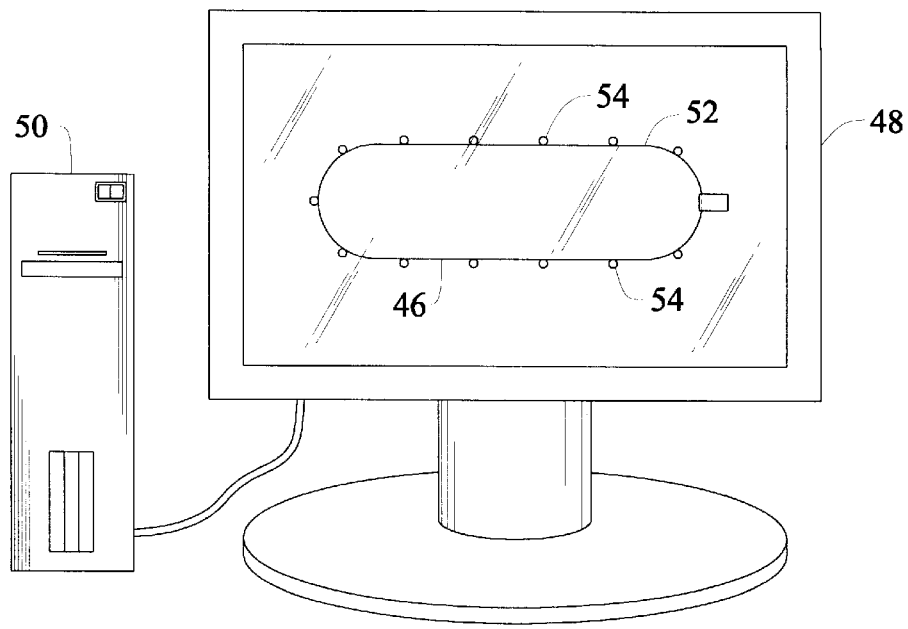

As shown in FIG. 8, additional jam location indicators may be located on a display 48 of a computer 50 instead of or in addition to on chain housing 18 itself. This arrangement is beneficial when the pathway 16 is particularly long and convoluted and where portions of the path are difficult to reach for inspection. FIG. 8 shows a display 48 which includes a representation 52 of pathway 16 as well as markers 54 representing each of sensors 22 along the pathway. Each of the controllers 38 is connected to computer 50 so that computer 50 receives continuous information on the values of the force on each load cell. When the force exceeds a predetermined value, the marker 54 can be changed to show where the jam is located. The display will immediately show the approximate location of the jam. It may be desirable, however, to use lamps 40 located close to each sensor 22 in addition to the indicators on the control panel to help a mechanic find the jam site. In addition to detecting jams, this arrangement beneficially allows for the continuous monitoring of chain tension at a number of locations around a track and this information can be displayed on monitor 48 and used to detect problems with the chain or system which result in higher chain tensions or tension fluctuations. For example, a chain tension that is too high at all points around the track may indicate a need for system lubrication. Chain surging may also be detected using this arrangement, and steps could be taken to control the drive to correct this problem. In a multiple drive system, the drives could be balanced by comparing the tensions at various points in the system and adjusting the speeds of the drives accordingly.

FIG. 6 shows a second embodiment of the subject invention in which a different type of sensor is used to detect changes in chain tension. The same reference numerals will be used to identify elements common to both embodiments. Sensor 58 in FIG. 5 comprises primary deflecting roller 24 and two secondary deflecting rollers 28 for deflecting chain 14 in an opposite direction from deflecting roller 24. Holder 33 is connected to a hinged support 60 comprising a first hinge element 62 having an outer end 64 and an inner end 66 and a second hinge element 68 having an outer end 70 and an inner end 72 connected by a securing pin 74. Outer end 70 of second hinge element 68 is supported in an opening 76 in a support block 78 which in turn is connected to a fixed support structure 80 by a nut 82. The outer end 64 of first hinge element 62 is supported in an opening 84 in a second support block 86. A Belleville washer arrangement 88 is connected between second support block 86 and a fixed structure 90 by a nut 92. The inner ends 66 and 72 of the hinged elements are connected to each other by securing pin 74, and the lengths of elements 62 and 68 are chosen so that when the outer ends of the respective elements are connected to the support blocks as described above, the surfaces of the first and second elements away from holder 33 will meet at an angle of less than 180 degrees.

Belleville washer arrangement 88 is pre-loaded to a predetermined "overload" tension indicative of a chain jam. Tension in chain 14 will force roller 24 and holder 33 against hinged support 60 and put pressure on Belleville washer arrangement 88. When this pressure exceeds a predetermined level, the washers will collapse and allow the hinged support to open to nearly 180 degrees. Stop 93 prevents the support from opening to 180 degrees and locking in that position. A limit switch 94 is provided in contact with hinge element 68 such that the movement of the hinged support actuates the switch and sends a signal to lamp 40 that tension has exceeded a given level.

FIG. 7 shows a third embodiment of the subject invention substantially similar to the second embodiment, except that in this case, the hinged support 60 is replaced with a single flexible support 100 having a first end 102 and a second end 104 pre-formed so that its top surface forms an angle of less than 180 degrees. A predetermined amount of force is needed to bend support 100 into a linear shape and to collapse Belleville washer arrangement 88. In this embodiment, no stop is needed as support 100 will return to its angled configuration when the tension in the chain returns to a normal level. When an overload force is applied to the washer assembly, the assembly collapses and triggers limit switch 94. This in turn causes the lamp 40 corresponding to that sensor to light. This embodiment otherwise operates identically to the device in the second embodiment.

The present invention has been described herein in terms of several preferred embodiments; however, it should be understood that many obvious changes and additions to these embodiments will become apparent to those skilled in the relevant art upon a reading and understanding of this specification. For example, flat guides may be used instead of rollers to deflect the chain from its linear path and alternate force-measuring devices can easily be imagined. Sensors could also be attached to the auxiliary deflectors. It is the intended that all such obvious modifications and additions be covered by this invention to the extent that they are included within the scope of the several claims appended hereto.

I claim:

1. A system for determining the location of a chain jam in a chain drive system comprising an endless drive chain driven around a pathway having a centerline by a drive, the system comprising:

plurality of indicators; and, a plurality of sensors for sensing chain tension from said drive, each sensor linked to one of the plurality of indicators, each sensor and linked indicator being independent of the other sensors and linked indicators, each sensor actuating said indicator linked thereto when said chain tension exceeds a predetermined amount in the vicinity of said sensor, at least a portion of the plurality of sensors and respective indicators positioned upstream of the drive.

2. The system of claim 1 wherein said sensors are spaced generally evenly around said pathway.

3. The system of claim 1 wherein said sensor comprises a primary chain deflector in contact with said chain for holding a portion of said chain away from said centerline.

4. The system of claim 3 further including first and second auxiliary chain deflectors located on either side of each of said primary deflector for holding said chain away from said centerline in a second direction opposite to said first direction.

5. The system of claim 3 further including an auxiliary deflector located between each pair of primary deflectors for holding said chain away from said centerline in a second direction opposite to said first direction.

6. The system of claim 3 wherein said sensor comprises a load cell for detecting the pressure exerted on said deflector by said chain.

7. The system of claim 3 wherein said sensor comprises mechanism adapted to collapse when the force thereon exceeds a predetermined value.

8. The system of claim 3 wherein said sensor comprises a limit switch.

9. A system for determining the location of a chain jam in a chain drive system comprising an endless drive chain driven around a pathway having a centerline by a drive, the system comprising:

at least one indicator; and, at least one sensor for sensing chain tension and actuating said at least one indicator when said chain tension exceeds a predetermined amount in the vicinity of said at least one sensor, wherein said indicator comprises a display for displaying a representation of said pathway and a representation of the sensors at which said chain tension exceeds a predetermined level.

10. In a conveyor system comprising a drive sprocket, a chain support, an endless chain supported by said chain support, a drive connected to said sprocket for turning said sprocket to move said chain about a pathway in said chain support, and a housing for partially enclosing said chain, the improvement comprising: a jam detection system for determining the location of a chain jam comprising:

a plurality of primary chain deflectors spaced along said pathway at least partially inside said housing for deflecting portions of said chain away from said pathway in a first direction, said first direction being perpendicular to the plane in which said chain travels;

a plurality of secondary chain deflectors located at least partially inside said housing and between said primary deflectors for deflecting said chain away from said pathway in a second direction, said second direction being opposite to said first direction;

a sensor connected to each of said plurality of primary chain deflectors for sensing the tension exerted on each of said deflectors by said chain and said drive, at least a portion of the plurality of primary and secondary chain deflectors and respective sensors positioned upstream of the drive; and, an indicator located in close proximity to each of said sensors for providing a visual indication that the tension sensed by one of said sensors has exceeded a given level;

each sensor and indicator providing a visual indication of tension independent from each other sensor and indicator.

* * * * *